United States Patent

Chen

[11] Patent Number: 6,041,198
[45] Date of Patent: Mar. 21, 2000

[54] DUAL RESOLUTION SCANNER

[75] Inventor: Philip L. Chen, E. Rolling Hills, Calif.

[73] Assignee: Avision Inc., Hsin-Chu, Taiwan

[21] Appl. No.: 09/104,246

[22] Filed: Jun. 24, 1998

[51] Int. Cl.[7] .................... G03G 15/043; G03G 15/04
[52] U.S. Cl. ..................... 399/51; 399/177; 399/203; 399/208
[58] Field of Search ................ 399/51, 52, 177, 399/206, 208, 211, 213, 203, 215, 220, 221; 359/197, 223, 225

[56] References Cited

U.S. PATENT DOCUMENTS

| | | | |
|---|---|---|---|
| 5,055,880 | 10/1991 | Fujiwara | 399/203 |
| 5,140,443 | 8/1992 | Iwahara et al. | 399/206 X |
| 5,339,139 | 8/1994 | Fullerton et al. | 399/203 |
| 5,589,972 | 12/1996 | Tellam et al. | 399/211 X |
| 5,839,036 | 11/1998 | Shogren | 399/213 |

*Primary Examiner*—Sandra Brase
*Attorney, Agent, or Firm*—H. C. Lin

[57] ABSTRACT

The focused light incident from the light source on the document to be scanned has two different lengths of light path. The shorter light path is incident on the document near the light source. The longer light path is incident on the document away from the light source with a larger light spot and scans the document at a higher speed to yield a lower resolution. The high resolution light ray reflected from the document and the low resolution light ray reflected from the document pass through a set of transmitting lenses tilted at different angles to irradiate two different sets of charge coupled device sensors.

9 Claims, 6 Drawing Sheets

DUAL RESOLUTION SCANNER

BACKGROUND OF THE INVENTION

This invention relates to scanners.

In a scanner, it is sometime desirable to provide two different resolutions. Traditional scanners usually has only one resolution. If dual resolution is provided, the scanner requires two optical systems with moving parts, which are bulky, expensive and unreliable.

SUMMARY

An object of this invention is to provide dual resolution for a scanner. Another object of this invention is to provide a low cost dual resolution scanner.

These objects are accomplished by providing two different optical paths for the light incident on the scanned document. For higher resolution, the light source is focused at a spot closer to the light source. For lesser resolution, the light source is focused with a larger light spot further away from the light source and travels a longer path to reach the document than the shorter path for the high resolution scanning. When the document is moved during scanning, the shorter focusing light from the source scans the document at a reduced scanning speed and document is advanced with a reduced speed. The reflected light rays from the two light spots pass through a set of transmitting lenses tilted at different angles to irradiate two separate sets of sensing charge coupled devices corresponding to high resolution and low resolution respectively.

DETAILED DESCRIPTION OF THE PREFERRED EMBODIMENT

Figure 1A:
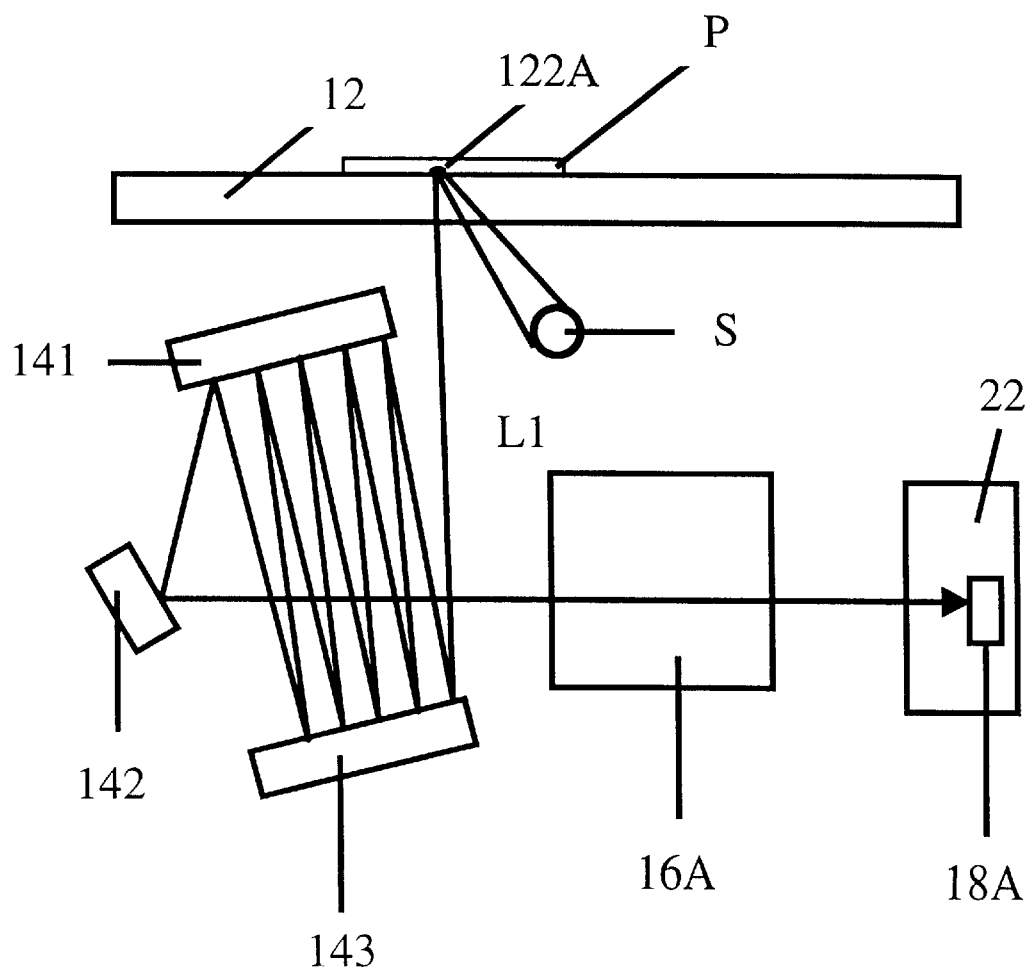
FIG. 1A shows a traditional flat bed scanner front-end design.

FIG. 1A shows a traditional design of a flatbed scanner. A transparent glass window 12 supports a document P to be scanned. A light source S irradiates document P at point 122A to extract picture information. The reflected light ray 11 from point 122A passes through a group of reflecting mirrors 141, 142 and 143, then a group of transmitting lenses 16A to reach a charge coupled device 18A.

Figure 1B:
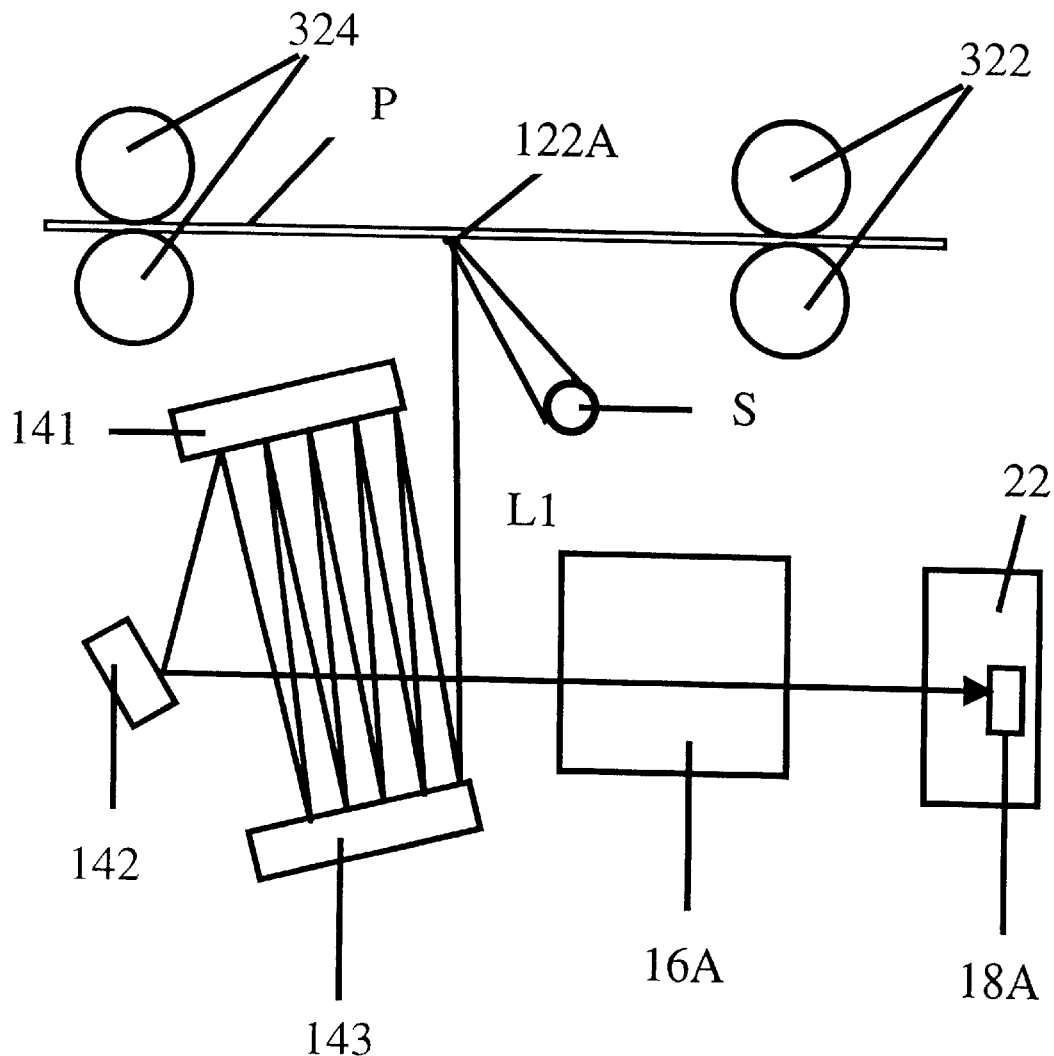
FIG. 1B shows a traditional feed-through type scanner front-end design.

FIG. 1B shows a front-end design of a traditional feed-through type scanner, which is similar to a flatbed scanner in certain respects, except that the window 12 becomes very narrow. The width needs only be wide enough to extract the picture content. To reduce cost, the transparent glass 12 can be eliminated as shown in FIG. 1B. In a traditional feed-through type scanner, the document P to be scanned is fed by a set of rollers 322 and conveyed by a second set of rollers 324 to another position. Although the figure shows two rollers to form a set, the conveyance of the document can also be accomplished with a single roller.

When the document P is incident from the light source S at point 122A, the picture information at that point is reflected as light ray L1, which passes through reflecting mirrors 141, 142, 143, then second group of transmitting lenses 16A, to reach a first group of charge coupled device 18A.

Figure 1C:
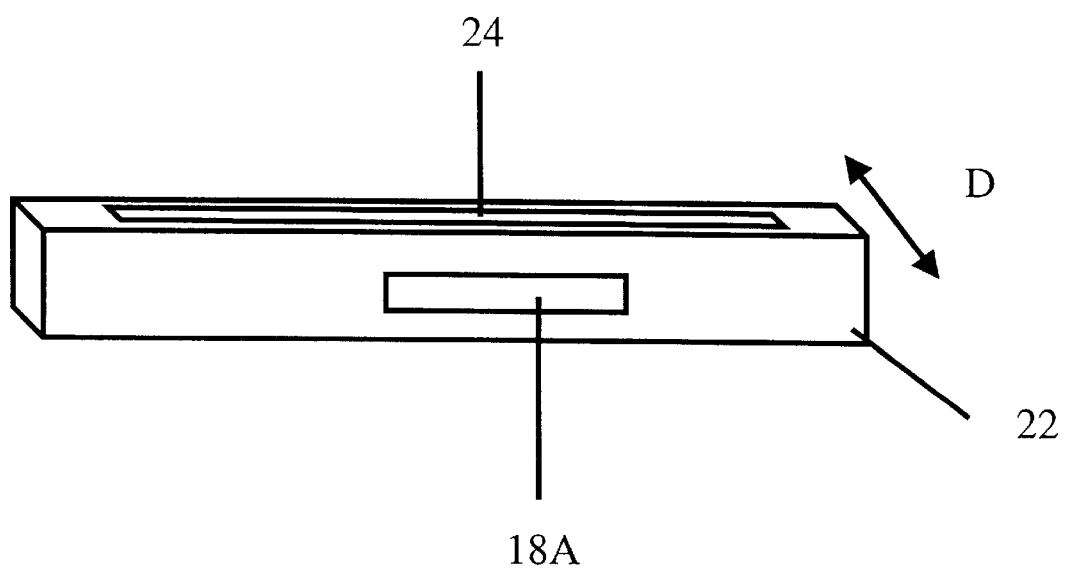
FIG. 1C shows a rear-end design of a traditional flatbed type or feed-through type scanner

FIG. 1C shows the rear-end design of a traditional flatbed scanner or feed-through type scanner. The frame of the scanner 22 is mounted with a charge coupled device set 18A to receive the light information radiated from a set of transmitting lenses 16A, so that the image information from the set of transmitting lenses 16A is incident on the set of charge coupled device 18A.

Figure 2A:
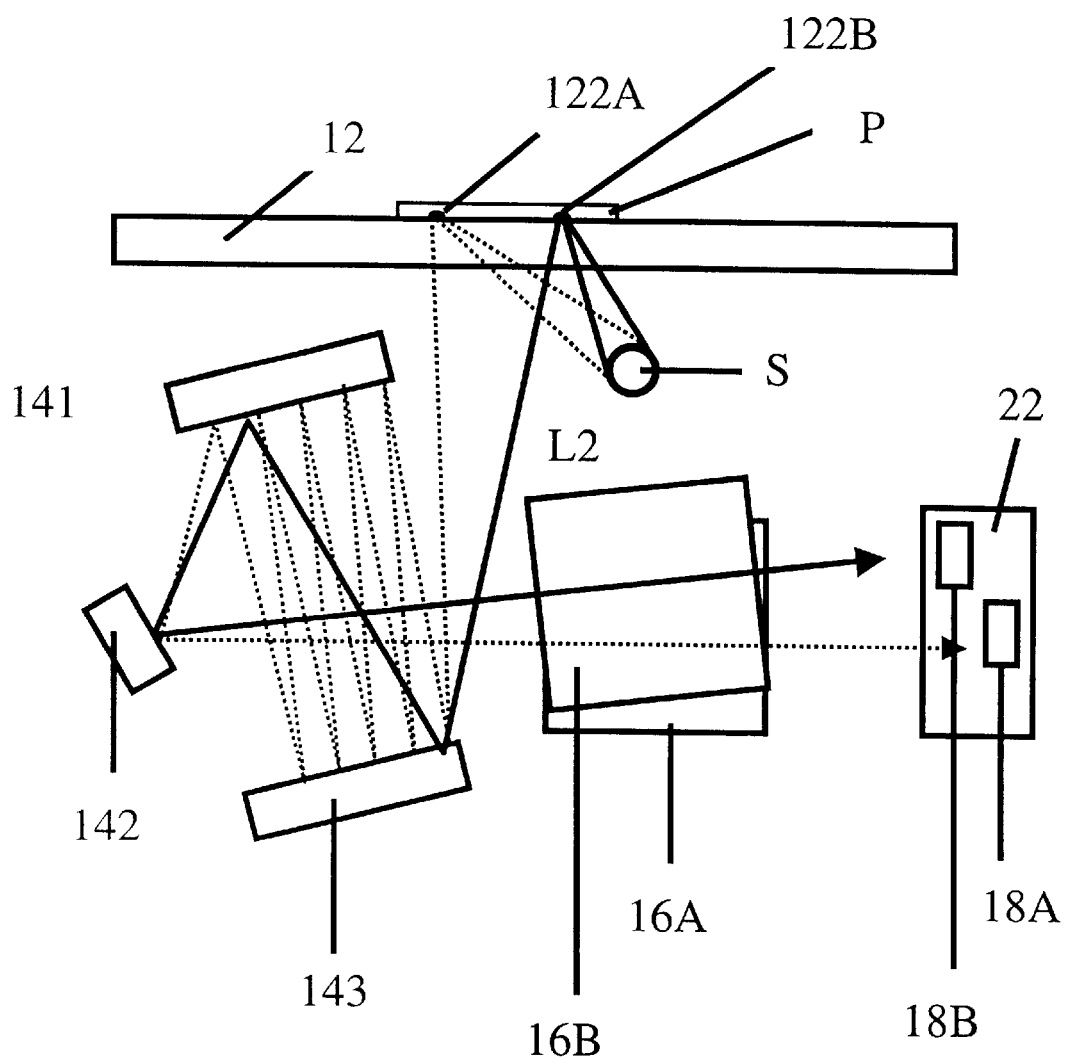
FIG. 2A, shows the front-end design of a flatbed scanner based on the present invention.

FIG. 2A shows a flatbed scanner design of the present invention. In addition to the components shown in the traditional structure shown in FIG. 1A, another set of transmitting lenses 16B and another set of charged coupled devices 18B are installed. The document is scanned by moving the document with respect to the light source. The focusing light from the light source can be incident on the document in one of two spots. The longer light path from the light source S shown in dotted line is incident on the document at point 122A near the end of the document for low resolution, but the shorter light path from the light source shown in solid line is incident on the document at point 122B only part-way from the end with a smaller light spot than the light spot at 122A for high resolution. The light ray L2 containing image information reflected from the lighted spot travels first through a set of reflecting mirrors 143, 141 and 142 and then a set of transmitting lenses 16A or 16B. These two sets of transmitting lenses are offset by an angle. This angle and the placement of the additional set of lenses is preset so that the image information reflected at point 122B of the document P lying on a glass window 12 travels along the solid line L2 through the set of reflecting mirrors 143, 141, 142, then through the set of transmitting lens 16B to irradiate the set of charge coupled devices 18B. On the other hand, the image information reflected at point 122A travels along the dotted line path L2' through the set of reflecting mirrors 143, 141 and 142 bouncing many times between the mirrors 143 and 141, then through the set of transmitting lenses 16A and be picked up by the set of charged coupled devices 18A. Note that FIG. 2A is not drawn to scale. In practice, the set of reflecting mirrors is located near the light S so that the solid light path L2 is much shorter than the dotted line light path L2'. Due to divergence of light ray, the longer light path L2' has a larger light spot when it reaches the charge coupled device 18A, and the shorter light path L2 has a smaller light spot when it reaches the charge coupled device 18B with higher resolution. For the lower resolution scanning, the document is advanced at a higher speed than the higher resolution scanning and the light spot also scans the document at a higher speed. Since the longer dotted light path from the light source to the incident spot scans a larger area than the shorter solid path and the light spot is less focused, the shorter light path gives a higher resolution than the longer light path.

Figure 2B:
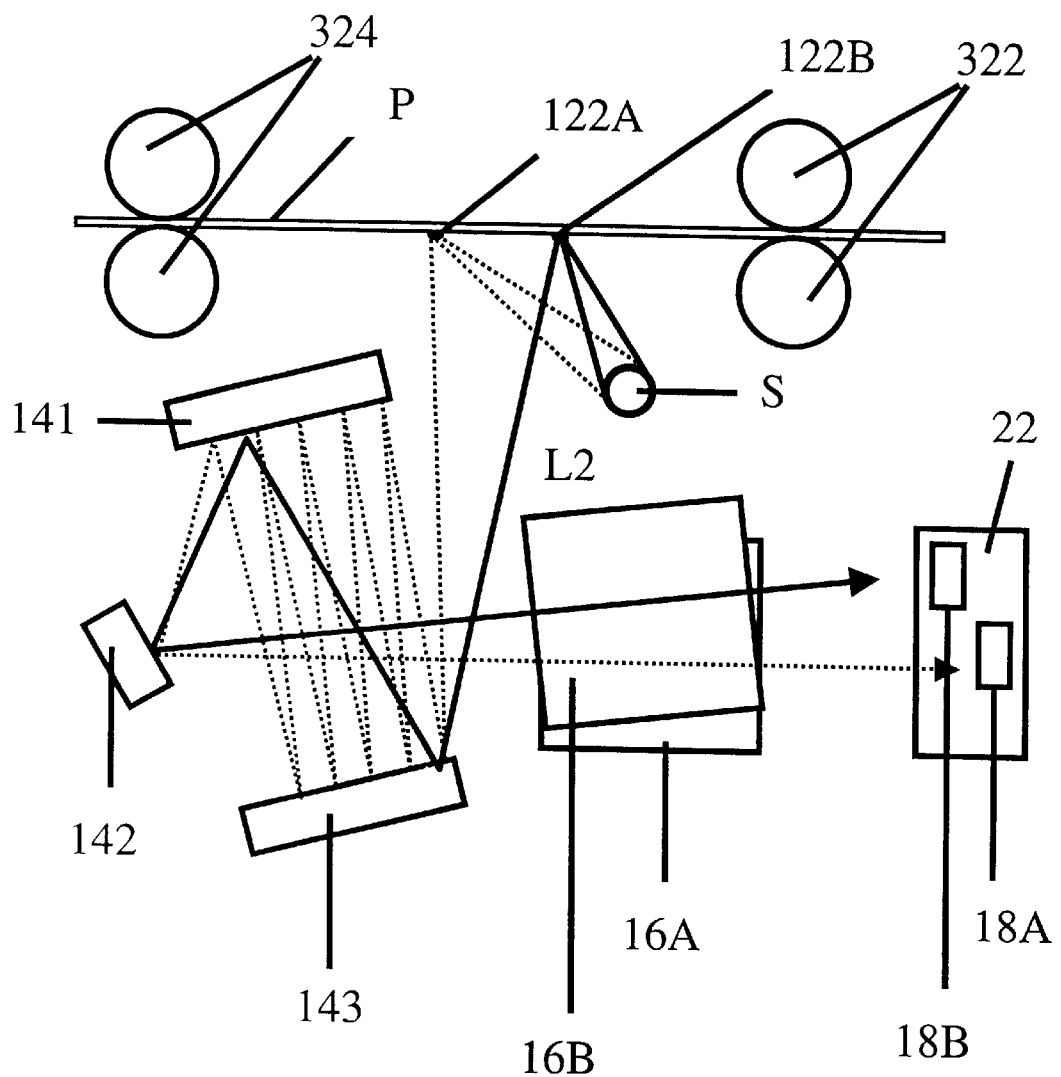
FIG. 2B shows the front-end design of a feed-through scanner based on the present invention.

FIG. 2B shows another embodiment of the feed-through type scanner design of the present invention. The scanning system is the same as that in FIG. 2A. In addition to the components shown in FIG. 1B, another set of transmitting lenses 16B and another set of charge coupled devices 18B are added. The document P in this embodiment is fed by two sets of rollers 322 and 324. When the light source S is incident at point 122B of the document from a shorter light path, the reflected ray L2 travels along a solid line first through a set of reflecting mirrors 143, 141, 142, then through a set of transmitting lenses 16B to irradiate a set of charged coupled devices 18B. When the light source is incident at point 122A of the document through a longer light path, the reflected ray travels along dotted line path L2' first through a set of reflecting mirrors 143, 141 and 142 bouncing many times between mirrors 143 and 141, then through a set of transmitting lenses 16A and irradiates the set of charge coupled devices 18A. The operation is similar to that in FIG. 2A.

Figure 2C:
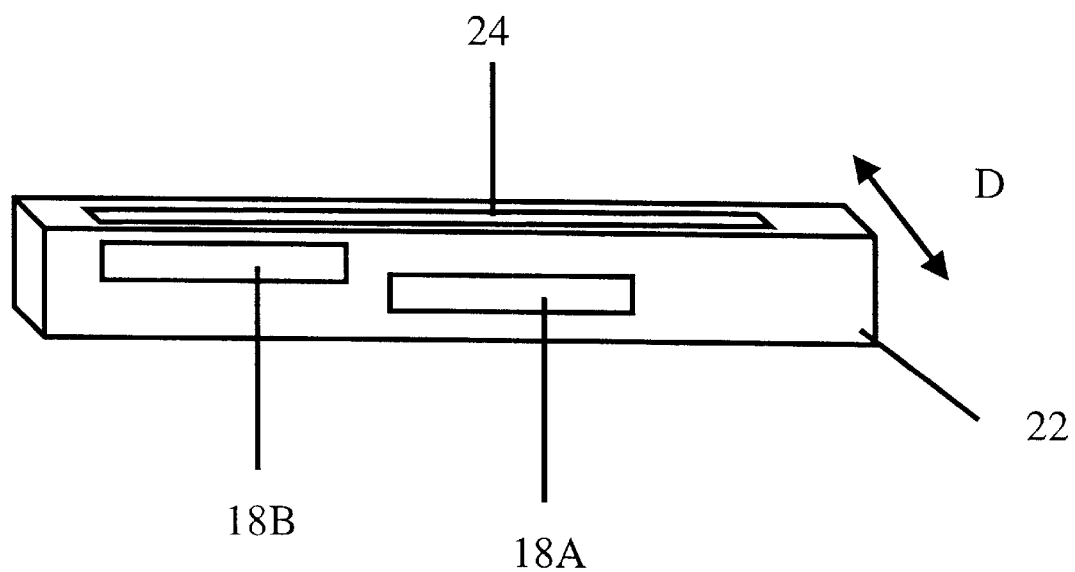
FIG. 2C shows the rear-end design of the present invention.

FIG. 2C shows he rear end design of the present invention for either the flatbed scanner or the feed-through type scanner. The frame of the scanner 22 is installed with the two sets of charge coupled devices 18A and 18B to receive the image information irradiated from lens set 16A and 16B respectively. The optical information is picked up line by line and outputted to either the charge coupled device set 18A or the charge coupled device set 18B. The scanner frame 22 moves back and forth along the arrow head D to perform the scanning function. Thus the scanner has two degrees of resolution. The shorter light path (solid line) from the light source to the incident spot on the document gives a higher resolution.

While FIG. 2A shows a flatbed scanner and FIG. 2B shows a feed-through type scanner, it is also possible to combine a flatbed with a set of rollers as shown in FIG. 2D. In this embodiment, a roller is used to convey a document over a glass plate.

For practical implementation of this invention, a Total Track Length (TT, distance between the light spot incident on the document and the sensing CCD) of 300 mm yields a resolution of 600*1200 dots per inch (DPI), while a TT of 177 mm yields a resolution of 1200*2400 DPI. For a 8.5" letter size window, the high resolution scanning can scan a half size paper or 8.5"/2=4.25".

While the preferred embodiments of the invention have been shown and described, it will be apparent to those skilled in the art that various modification may be made in the embodiments without departing from the spirit of the present invention. Such modifications are all within the scope of this invention.

What is claimed is:

1. A dual resolution scanner for scanning a document, comprising a frame for housing said scanner;

a light source for focusing a light beam on said document at one of two spots, a first spot of said two spots being closer to said light source and more focused than a second spot of said two spots;

a first set of sensors for sensing first light ray reflected from said first spot;

a second set of sensors for sensing second light ray reflected from said second spot and displaced from said first set of sensors and means for advancing and scanning said document at a slower speed when said first spot is focused than when said second spot is focused.

2. A dual resolution scanner as described in claim 1, further comprising two sets of transmitting lenses tilted at different angles to transmit said first ray and said second ray to said first set of sensors and said second set of sensors, respectively.

3. A dual resolution scanner as described in claim 2, further comprising a set of reflecting mirrors interposed between said document and said two sets of transmitting lenses.

4. A dual resolution scanner as described in claim 1, wherein said scanner is a flatbed scanner with said document lying on a scanning window.

5. A dual resolution scanner as described in claim 1, wherein said scanner is a feed-through type scanner with said document fed by two sets of rollers for clamping and conveying said document.

6. A dual resolution scanner as described in claim 1, wherein said document is conveyed by a roller over a glass window.

7. A dual resolution scanner as described in claim 1, wherein said sensors are charge coupled devices.

8. A dual resolution scanner as described in claim 1, wherein said first set of sensors and said second set of sensors are mounted on the frame of said scanner.

9. A dual resolution scanner as described in claim 1, wherein the width scanned by the first light spot is narrower than the width scanned by said second light spot.

* * * * *